United States Patent [19]

Moser et al.

[11] Patent Number: 5,504,801

[45] Date of Patent: Apr. 2, 1996

[54] USER-CONTROLLED ELECTRONIC MODIFICATION OF OPERATING SYSTEM FIRMWARE RESIDENT IN REMOTE MEASUREMENT UNIT FOR TESTING AND CONDITIONING OF SUBSCRIBER LINE CIRCUITS

[75] Inventors: Laura E. Moser, Newbury Park; Edward K. W. Siu, Simi Valley; Michael Kennedy, Ventura; Onofrio Schillaci, Camarillo, all of Calif.

[73] Assignee: Harris Corporation, Melbourne, Fla.

[21] Appl. No.: 193,814

[22] Filed: Feb. 9, 1994

[51] Int. Cl.$^6$ .................................................. H04M 11/00
[52] U.S. Cl. ................................. 375/29; 379/27; 379/34
[58] Field of Search .......................... 370/13, 16; 375/1, 375/22, 26, 27, 29, 30, 32, 34; 395/600

[56] References Cited

U.S. PATENT DOCUMENTS

| | | | |
|---|---|---|---|
| 4,001,559 | 1/1977 | Osborne et al. | 235/151.31 |
| 4,459,436 | 7/1984 | Rubin | 179/175 |
| 4,536,617 | 8/1985 | Perry | 375/292 |
| 5,111,497 | 5/1992 | Bliven et al. | 379/27 |
| 5,155,847 | 2/1993 | Kirouac et al. | 395/600 |
| 5,268,928 | 12/1993 | Herh et al. | 375/8 |
| 5,301,050 | 4/1994 | Czerwiec et al. | 375/29 X |

FOREIGN PATENT DOCUMENTS

| | | | |
|---|---|---|---|
| 0217351 | 4/1987 | WIPO | G06F 15/16 |
| 0454316 | 10/1991 | WIPO | H04M 3/30 |
| 0632629 | 1/1995 | WIPO | H04L 29/06 |

*Primary Examiner*—Stephen Chin
*Assistant Examiner*—Paul Loomis
*Attorney, Agent, or Firm*—Charles E. Wands

[57] ABSTRACT

A remote test unit for testing and conditioning one or more telephone lines includes multiple electronically erasable flash memory banks, which contain respective versions of the operating system employed by the test unit's microcontroller. An operating system modification routine employed by the host processor of a remote site allows the functionality of the remote test unit to be selectively modified by electronically installing an upgraded or downgraded version of the operating system, or by electronically selectively activating or deactivating one or more operational features of the currently active operating system.

29 Claims, 4 Drawing Sheets

USER-CONTROLLED ELECTRONIC MODIFICATION OF OPERATING SYSTEM FIRMWARE RESIDENT IN REMOTE MEASUREMENT UNIT FOR TESTING AND CONDITIONING OF SUBSCRIBER LINE CIRCUITS

CROSS-REFERENCE TO RELATED APPLICATIONS

The present invention relates to subject matter disclosed in co-pending application Ser. No. 08/194,203, filed coincident herewith, entitled: "Local/Remote Modification of Electronically Alterable Operating System Firmware Resident in Redundant Flash Memory of Remote Unit for Testing/Conditioning Subscriber Line Circuits," by E. Siu et al, assigned to the assignee of the present application and the disclosure of which is herein incorporated.

FIELD OF THE INVENTION

The present invention relates in general to communication systems, such as telephone systems, and is particularly directed to a mechanism for controllably electronically modifying the functionality of measuring and test routine, contained within a remote, programmable test device, which is operative to monitor and test network lines and subscriber termination equipment coupled thereto, without the need for on-site, physical access, and removal and replacement of digital processor and memory circuitry of the test device.

BACKGROUND OF THE INVENTION

Measuring and test equipment currently employed by telephone service providers customarily contains a variety of conditioning and signal generation functions which enable service and maintenance personnel to apply a prescribed number of electrical stimuli to a line, such as a (digital) subscriber loop, for the purpose of trouble-shooting the line and measuring its performance. A non-limitative example of such equipment is diagrammatically illustrated in FIG. 1, which shows the distribution of a plurality of (microprocessor-controlled) remote measurement units (RMUs) 11, which are installed at a plurality of sites geographically remote with respect to each other and a supervisory site 12.

Figure 1:
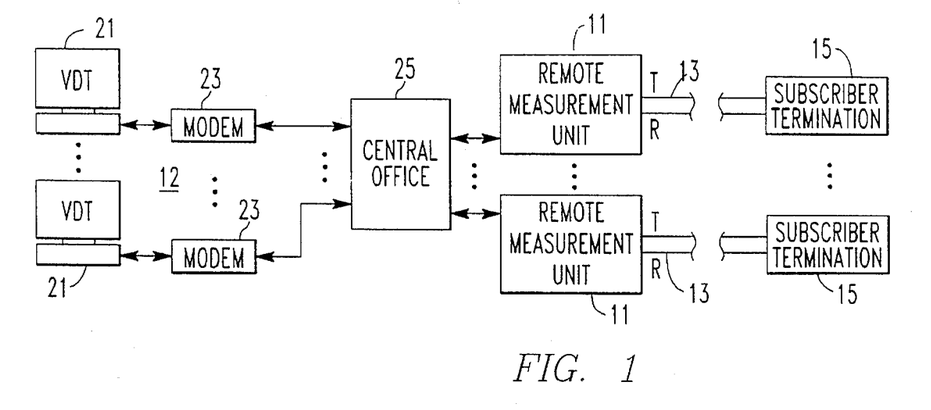
FIG. 1 diagrammatically shows the distribution of a plurality of microprocessor-controlled remote measurement units installed at a plurality of sites geographically remote with respect to each other and a supervisory site.

An RMU 11 includes various components, such as tone generation and electrical conditioning circuitry which, under the control of a firmware-resident measurement and test mechanism contained in the resident operating system employed by an on-board processor, selectively transmit prescribed test signals to the line, and may also condition the line with electrical circuit parameters, that allow an associated line measurement unit to conduct line measurements and thereby determine the current state of the line and its ability to successfully perform as intended.

For this purpose, each RMU 11 is typically of the type that conforms to computer interface requirements defined in Issue 3 of AT&T Publication KS-23253 and contains internal firmware, which is operative to perform various diagnostic or test operations on network lines 13 and (subscriber) termination equipment 15. The RMU may be accessed by means of one or more video display terminals (VDTs), or data terminal units (DTUs) 21 at the supervisory site 12, which have the capability of accessing the remote test equipments 11 through attendant modem devices 23, such as industry standard Hayes 'AT'-compatible 300/1200 units, that are linked to a central office 25.

Because test and conditioning parameters and customer-requested performance features may differ among various pieces of equipment, whenever it is necessary to perform a repair, or effect a change to the functionality of the firmware (e.g. change an instruction set), it is customary practice for a service technician (craftsperson) to travel to the site where the equipment is installed, and either make a component or board replacement in the field, or, as is more often the case, retrieve the unit, bring it back to a servicing site, where a repair or retrofit is performed, and then return the modified unit to the remote site, so that it may be placed back in service.

SUMMARY OF THE INVENTION

In accordance with the present invention, the costs in labor and down time required to service a remote test unit in the manner described above are substantially reduced by configuring the firmware-memory architecture of the unit's micro-controller of a pair of redundant, erasable flash memory systems, that enable the operating system firmware of a remote monitoring unit to be selectively, electronically modified, in particular erased, replaced and features selectively turned on, from a supervisory device (e.g. a data terminal coupled via an attendant modem to the central office, or via a personal computer connection to a serial port (e.g. RS-232 port) of the test unit).

More particularly, pursuant to the present invention, associated with the resident control processor of the remote measurement and test unit (RMU) are two memory systems, which respectively store electronically modifiable active and inactive 'quasi-redundant' versions of the micro-controller's system software. By 'quasi-redundant' is meant that each memory system contains a version of the operating system firmware that is potentially capable of operating the RMU. To provide for remote electronic reprogrammability each memory system is configured of one or more flash memory devices. When an RMU is powered up or reset, a reset routine described in detail in the above-identified co-pending application ensures that the 'correct' one of the two quasi-redundant systems available to the RMU's microcontroller will become the operating system.

Normally, after a modification, the 'correct' system is the previously off-line system that has been changed. However, should this modified inactive system contain an anomaly that will prevent successful operation of the test device, it is necessary that the inactive system remain off-line and the unit continue to operate with the currently running version of the firmware. In accordance with the invention described in the above-identified co-pending application, these objectives are achieved by the use of a prescribed reset routine and by structuring the contents of the modified inactive memory system to include a precursor set of instruction code that prevents an accidental boot-up from the off-line system (in which one or more memory systems have been erased) and thereby avoids anomalous operation of the RMU.

For this purpose, a precursor section of common code memory space is loaded with an instruction sequence that forces the off-line system, if accessed, to perform a continuous no operation loop. Whenever the RMU begins executing the firmware in either system, a time-out clock is started. Unless the operating system code, which is located in memory address space immediately following the no operation loop, begins executing prior to expiration of the time-out, a switch to the other operating system is performed.

Once transfer of modified (e.g. upgraded) software to the designated bank(s) of the inactive system has been completed, the host processor in the user's data terminal unit commands the RMU to reset itself. With the RMU containing two different versions of the operating system, one of which is the newer version and the other of which is the previously active routine which is to go off-line, the reset routine described in the above-referenced co-pending application is executed to ensure that the 'correct' one of the two quasi-redundant systems available to the RMU's microcontroller will become the operating system.

When an RMU is initially installed, each of its flash memory systems contains the same firmware version of the operating system, so that the operating system firmware in each memory system is a duplicate of the other. Except for activating an installed feature, when a modification is to be made to the RMU's firmware, it is the off-line or inactive version in the redundant memory system that is changed. After a change has been completed, the system is reset and the changed version is activated, while the previously running version is deactivated.

In accordance with a first aspect of the present invention, which involves remotely, electronically performing an 'upgrade' of operating system firmware in an RMU, it is necessary to install a newer version of the operating system firmware than the one currently running. Since an upgrade involves an enhancement to equipment functionality, for each RMU user, a functionality/use descriptor file, which contains information as to what firmware version a unit currently contains and what features it is permitted to use, is initially accessed. The functionality/use descriptor file is effectively a permission and capability file that tells the installer what may and what may not be installed for a particular RMU. Access to this file allows an upgrade installer to determine whether a requested upgrade may be performed. If an upgrade to a specified RMU is permitted, a communication is established between the (host processor of the) accessing terminal unit and the RMU.

Once connectivity with the destination RMU has been established, the host processor requests a copy of a bank descriptor table contained in the RMU. The bank descriptor table details the contents of the firmware versions currently stored in the respective flash memory systems of the RMU. The contents of the bank descriptor table are analyzed by the remote control (host) processor in order to facilitate the transfer or downloading of only those portions of firmware that are necessary to effect the requested upgrade.

Since modification of the contents of flash memory requires an erasure of a complete block or bank of memory and then a rewriting of new data into the erased memory space, the host processor next proceeds to erase each block of flash memory of the 'inactive' operating system which is to receive a 'target' firmware upgrade. The upgrade software is then written into the erased blocks of the inactive memory. Once the transfer of the upgraded software to the designated blocks of inactive system is completed, the RMU is commanded to activate the newly downloaded software upgrade in the inactive system and deactivate the currently active system containing the previous version.

After the operational feature set available for use by the RMU is turned-on, the RMU is commanded to reset itself, which causes its internal processor to default to that memory system which is not marked invalid and contains the highest version of operating system firmware, that the reset routine has determined is operationally valid and not in downgraded status. At any given time, only one memory system can be marked invalid.

After being reset, the RMU begins executing the upgraded version of its operating system, and the host processor terminates the connection to the RMU. The final step of an upgrade is for the host processor to reconnect with the RMU and request a copy of the bank descriptor table contained, in order to verify that the RMU is currently running the upgraded firmware.

A second aspect of the invention is directed to performing a 'downgrade' of existing RMU firmware, whose purpose is to invalidate the currently running version of the operating system in the active memory system and to activate the 'quasi-redundant' version of the operating system resident in the inactive memory system. Downgrading an operating system version implies that an upgrade has previously taken place, the currently running version of operating system firmware being the upgraded version, and the inactive memory system containing an earlier version of the operating system.

As is the case with an upgrade, once a communication has been established between the host processor of the accessing terminal unit and an addressed RMU, the host processor commands the RMU processor to mark the currently running system as invalid and commands the RMU to reset itself, whereby the RMU's control processor defaults to that memory system which contains the previously inactive version of its operating system, which is not marked invalid. After transmitting a reset and terminating the connection, the host processor re-establishes a connection with the RMU and requests a copy of the bank descriptor table to verify that the RMU is currently running the previously inactive firmware version.

Pursuant to a third aspect of the invention, one or more features of the firmware may be selectively activated. To activate a feature (which is similar to an upgrade in that it involves an enhancement to the functionality of the currently active program), it is necessary to turn on one or more programmable features contained within the active system, but not currently allowed to be used by the RMU. Until activated, operational features are invisible to the RMU processor. Associated with each operational features of a respective firmware version is a status bit, which is one ('1') when the firmware is initially installed. Activation of a feature involves switching the state of the feature bit from a first logical state (e.g. a logical '1') to a second logical state (e.g. a logical '0').

Each remotely switchable feature status bit is preferably contained in a feature status table stored in a prescribed portion of memory. For example, to accommodate up to sixteen features, a pair of sequential feature bytes may be employed. Via a virtual to physical map associated with the feature byte, the user may delineate which feature or features are to be selectively enabled in the active system. With flash memory, programming a memory bank involves first erasing the entire bank and then changing the erased states of selected memory cells. Thus, when a feature is to be enabled or switched on, it's status bit in the feature table is changed from its original reset state '1' to an active state '0'.

Like an upgrade, since the routine employed for feature activation involves an enhancement to equipment functionality, the functionality/use descriptor file is first examined to whether a requested feature is available. If activation of the requested feature is not permitted or if the feature is not available the routine is terminated. If the requested feature is available a communication is established between the accessing terminal unit and the RMU. The host processor requests a copy of the bank descriptor table contained in the RMU and analyzes the table in order to determine whether the currently running firmware version contains the requested feature(s). If the currently running version does not contain the feature to be activated, then an upgrade to a software version containing the requested feature is performed. If the currently active system contains the requested feature(s), the host processor commands the RMU to activate the feature by changing the logic state of the appropriate feature switch bit, thereby making the feature available for use in the currently active system. Once the requested feature activation is complete, the host processor goes back on-hook.

A further aspect of the invention involves the ability to selectively 'deactivate' one or more features of a currently running system. This aspect of the invention may be employed when it is necessary to turn off or disable a feature that has been previously enabled, for example in the case of a feature that was inadvertently turned on when the operating system was originally installed.

For this purpose, once connectivity with the destination RMU has been established, the host processor commands the RMU to erase each block of flash memory of the 'inactive' system which contains a feature to be deactivated. It then commands the RMU to rewrite the software (with no features turned on) into its associated blocks of flash memory of the RMU's inactive operating system. Once a rewrite of the software to the designated blocks of inactive bank has been completed in the inactive memory bank, the host processor commands the RMU to reset itself and reverses the states of the two memory systems, thereby making the inactive system where the reset features reside active, and the currently running system inactive.

The host processor next commands the RMU to erase each block of flash memory of the 'inactive' system, which contains a feature to be deactivated, and commands the RMU to rewrite the software (with no features turned on) into its associated blocks of flash memory of the RMU's inactive bank. The host processor then commands the RMU to activate selected features (excluding those to remain deactivated) by changing the logic state of the appropriate feature switch bit from its initially erased state to an opposite logical state, thereby making the non-deactivated features available for use in the currently active system. Once the requested feature activation is complete, the host processor terminates the connection.

DETAILED DESCRIPTION

Before describing in detail the test routine modification mechanism in accordance with the present invention, it should be observed that the present invention resides primarily in what is effectively the installation of a pair of flash memory systems in a remote test unit, in which respective active and inactive quasi-redundant versions of operating system firmware are stored, together with an augmentation of the control software employed by a 'master' test system controller (host processor) and the micro-controller within a programmable monitor and test unit, which permit a host processor to selectively establish a control link with and selectively alter the functionality of a subscriber line measuring and test operative system contained within a 'slave' test device, without the need for on-site, physical access, and removal and replacement of digital processor and memory circuitry of the test device.

Consequently, the configuration of such a remote test unit and the manner in which it is interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Various aspects of the test routine modification mechanism of the present invention will be described with reference to FIGS. 3–6, which show respective operating system modification flow routines, the execution of which is operative to modify the functionality of a measuring and test operating system, contained within an RMU, without the need for on-site, physical access, and removal and replacement of digital processor and memory circuitry of the test device.

As pointed out above, in order to enable the present invention to controllably modify, electronically from a remote site, the operating system firmware employed by the telephone line monitor and test unit, the architecture of the processor board within the test unit contains a plurality (pair) of flash memory systems, which store respective electronically modifiable active and inactive versions of the micro-controller's firmware (as opposed to the conventional use of a single dedicated read-only memory module to store a non-modifiable version of the unit's firmware).

Figure 2:
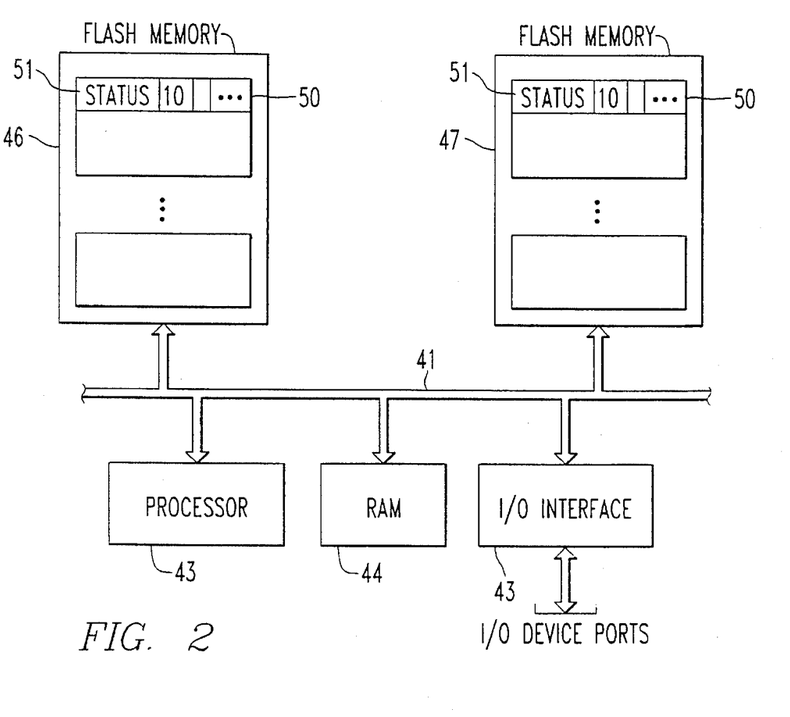
FIG. 2 diagrammatically illustrates the architecture of the micro-controller of an RMU having system bus, control processor, random access memory, an input/output interface unit, and firmware flash memories.

For this purpose, as diagrammatically illustrated in FIG. 2, coupled with the test unit's system bus 41 are a control processor 43, attendant random access memory (RAM) 44, and input/output (I/O) interface unit 45 (containing associated analog-to-digital converter (ADC) and digital-to-analog converter (DAC) units with which a line under test (LUT) may be controllably connected), and a pair of memory systems 46 and 47. Each of memory systems 46 and 47 is preferably implemented of one or more flash memory device, so that the memory system may be electronically erased and reprogrammed.

As will be described, whenever the RMU is powered up or reset, e.g. after a firmware modification, processor 43 is driven by the operating system stored in that one of memory systems 46 and 47 which a reset routine has determined is a newer version and the other of which is a previously active routine which is to go off-line, the reset routine being executed to ensure that the 'correct' one of the two quasi-redundant systems available to the RMU's microcontroller will become the active operating system. The active operating system has its status identifier bit 51 in a header portion 50 of a prescribed memory bank denoted as 'active' high (1), the other system having its status identifier bit denoted as 'inactive' low (0). Each flash memory system stores a respective version of the line monitoring and test firmware (RMU operating system). When the RMU is initially installed at a test site, each of its pair of redundant memory systems contains the same firmware version of the operating system, so that each is a duplicate of the other. Thereafter, whenever a modification is to be made to RMU firmware, it is the (off-line) inactive version in the redundant memory bank that is changed. After a change has been completed, the system is reset and the changed version is activated, while the previously running version is deactivated.

In a network such as that diagrammatically illustrated in FIG. 1, access to an RMU 11, which may be effected from a remote site, such as a VDT 21 located at a supervisory site and coupled via a modem 23 to the central office 25, or from a local host processor, such as that connected to a serial port at the RMU site by a service technician, entails the customary logging in of customary communication precursors, such as connection type (modem or directly through a serial port), and for a modem include the identification of the telephone access number, a unit password, and baud rate. Once a connection is established between an accessing (calling) terminal unit (e.g. VDT 21) and a called RMU, any of the reprogrammability aspects of the present invention to be described with reference to the flow routines of FIGS. 3–6 may be executed.

Figure 3:
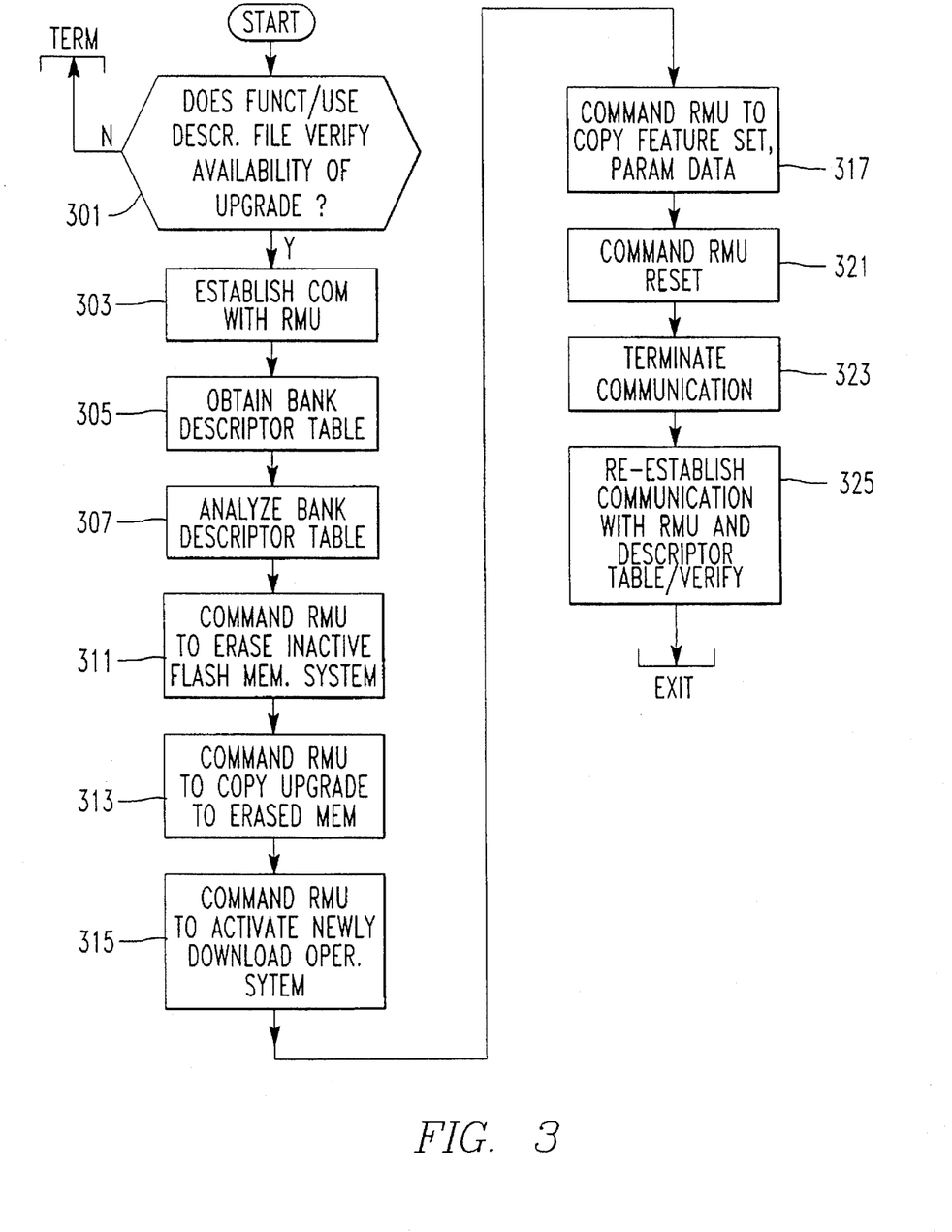
FIG. 3 is a process flow routine of the steps carried out for upgrading the existing firmware in an RMU.

FIRMWARE UPGRADE (FIG. 3)

Upgrading the existing firmware in the RMU involves the installation of a newer version of the operating system firmware than the one currently running, for example a version containing enhanced versions of currently available features, or the addition of one or more features not previously provided in the earlier version. As a non-limitative example, such a feature may involve the ability of the unit to condition the telephone line with a prescribed set of operational or test parameters. For purposes of the present description, using conventional nomenclature in the industry, a previous version of RMU firmware will be denoted as RMU version 1.0, and an upgraded version will be denoted as RMU version 2.0.

Since an upgrade involves an enhancement to equipment functionality, a functionality/use descriptor file is maintained for each RMU user. This file contains information, inter alia, as to what firmware version a unit currently contains and what features it is permitted to use. The functionality/use descriptor file may also contain other information such as the number of RMUs to which the upgrade may be supplied. In other words, the functionality/use descriptor file is effectively a permission and capability file that tells the installer what may and what may not be installed for a particular RMU. Therefore, as shown at query step 301, whenever an upgrade is to be performed, prior to establishing a connection from an upgrading source terminal (e.g. VDT 21) to a called RMU, the upgrade installer first accesses functionality/use descriptor file and determines whether a requested upgrade may be performed. If the request upgrade is not permitted (the answer to step 301 is NO), the routine is terminated. (At this point, the upgrade requester is also normally advised of the reason why the upgrade was not performed.)

If it has been determined from the functionality/use descriptor file that an upgrade to a specified RMU may proceed (the answer to step 301 is YES), then, as shown at step 303, a communication is established between the accessing terminal unit and the RMU, using a conventional connectivity sequence employing precursor information, as described above. Once connectivity with the destination RMU has been established, the host processor requests a copy of a bank descriptor table contained in the RMU (step 305), the bank descriptor table detailing the contents of the firmware versions currently stored in the respective memory banks 46 and 47.

Next, in step 307, the contents of the bank descriptor table are analyzed by the host processor in order to determine what firmware versions are currently stored in memory systems 46 and 47. The purpose of this step is to facilitate the transfer or downloading of only those portions of operating system firmware that are necessary to effect the requested upgrade.

As pointed out in the above-referenced co-pending application, whenever the contents of one or more memory banks of the inactive system are to be changed, in order to facilitate (reduce the time required for) programming of the erased bank in the active system, the source of the code to be loaded into the inactive bank is preferably obtained from a bank in the active system, so that a direct copy operation may be performed over the RMU system bus. If not, the upgrade is downloaded from the master terminal device.

The reprogramming host processor compares the current firmware versions stored in memory (e.g. RMU versions 1.0) with the upgrade or target version of firmware (e.g. RMU version 2.0). For those blocks of flash memory within the RMU's dual memory system which contain portions of firmware identical to corresponding portions of the target version, a modification of such blocks is unnecessary.

As pointed out earlier, since modification of the contents of a flash memory device requires an erasure of a complete block and then a rewriting of new data into the erased memory space, in step 311, the host processor next proceeds to erase each block of flash memory of the 'inactive' bank which is to receive a target firmware upgrade or rewrite. In step 313, the upgrade software is written into its associated blocks of flash memory of the RMU's inactive bank.

Once the transfer of the upgraded software to the designated blocks of inactive bank has been completed, (in the present example, the currently inactive memory bank contains a complete copy of RMU version 2.0), the host processor in the user's VDT commands the RMU, in step 315, to activate its inactive bank containing the newly downloaded software upgrade (and simultaneously deactivate the currently active bank containing the previous version RMU 1.0). With the upgraded system now active, in step 317, the host processor next commands the RMU to copy the operational feature set available for use by the RMU (but not yet turned-on), and other prescribed identification data, such as date of manufacture, serial number, etc., that will enable a data terminal unit subsequently accessing the RMU to obtain complete information as to what firmware is contained in the RMU.

Next, in step 321, the host processor commands the RMU to reset itself. In accordance with the operational program executed by the RMU, in the course of a reset or power-up, the RMU's control processor defaults to that memory bank which is not marked invalid and contains the highest version of firmware (RMU version 2.0 in the present example). A memory bank is marked invalid by writing an invalid bit pattern into a header portion of the bank. (At any given time, only one memory bank can be marked invalid.)

Upon completion of the reset routine described in the above-identified co-pending application, which is operative to verify the operational validity of the upgrade, the RMU will begin executing the upgraded 2.0 version of its operating system. After transmitting a reset command to the RMU, the host processor terminates the connection (goes on-hook), in step 323.

Finally, in step 325, the host processor re-establishes a connection with the RMU and, as in step 305, requests a copy of the bank descriptor table contained in the RMU. As noted previously, the bank descriptor table details the contents of the firmware versions currently stored in the respective memory banks 46 and 47. Because of the upgrade, the bank descriptor table will identify both RMU version 1.0 (currently inactive) and the upgraded RMU version 2.0. The host processor examines the contents of the requested descriptor table in order to verify that the RMU is currently running the upgraded firmware version 2.0. If not, an error message is generated. Otherwise the host processor logs off, as shown by exit.

Figure 4:
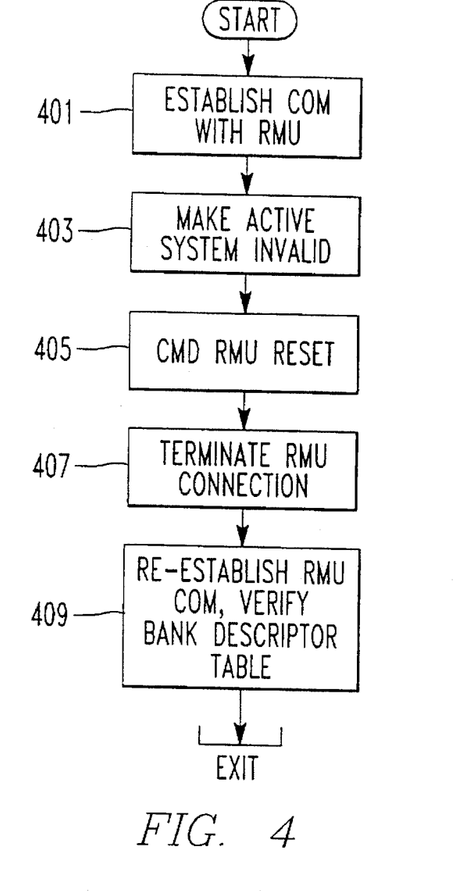
FIG. 4 is a process flow routine of the steps carried out for downgrading the existing firmware in an RMU.

FIRMWARE DOWNGRADE (FIG. 4)

Downgrading existing firmware in the RMU implies that an upgrade (described above with reference to FIG. 3) has previously taken place, so that the currently running version of firmware is the upgraded version (e.g. RMU version 2.0), and the inactive memory bank contains the previous RMU version 1.0. The purpose of a downgrade is to invalidate the currently running version and to activate the version contained in the inactive memory bank.

To initiate a downgrade, at step 401, a communication is established between the host processor of the accessing terminal unit (e.g. VDT 21) and an addressed RMU 11, using a conventional connectivity sequence employing precursor information, as described above. Once connectivity with the destination RMU has been established, the host processor in the downgrade-controlling data terminal commands the RMU processor to mark the currently running system as invalid. This is accomplished in step 403 by writing an invalid code or bit into a prescribed portion (header 50) of the currently active memory system. As noted earlier, at any given time, only one memory system can be marked invalid. Therefore, if the inactive memory system were already marked invalid, attempting to execute step 403 would cause the generation of an error message by the host processor for display on the user's VDT. With the currently running firmware version now marked invalid, the host processor next commands the RMU to reset itself (step 405).

As described earlier, pursuant to the operational program executed by the RMU, in the course of a reset or power-up, the RMU's control processor defaults to the version of the quasi-redundant operating system which is not marked invalid and contains the highest version of the operating system firmware. Although, in the present example, the highest RMU version is version 2.0, it has been marked invalid in step 403. As a consequence, in response to the reset command in step 405, the RMU will begin executing the previously inactive 1.0 version of its operating system, which is not marked invalid. After transmitting a reset command to the RMU, the host processor terminates the connection (goes on-hook), in step 407.

Finally, in step 409, the host processor re-establishes a connection with the RMU and, as in the upgrade routine of FIG. 3, requests a copy of the bank descriptor table contained in the RMU, so that it may verify that the RMU is currently running the previously inactive firmware version 1.0. If not, an error message is generated. Otherwise the host processor logs off, as shown by exit.

Figure 5:
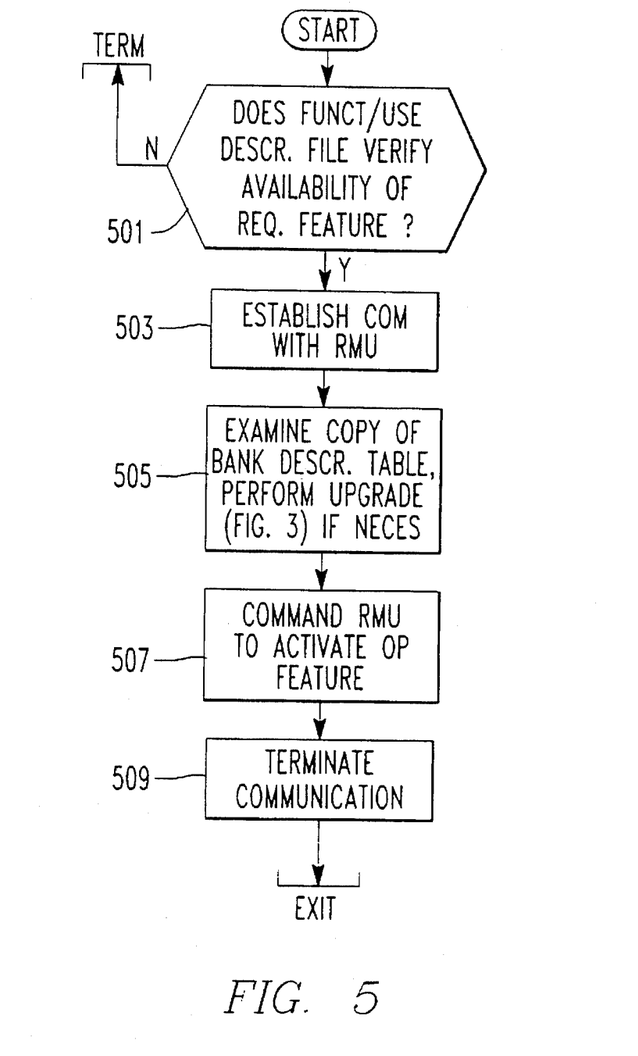
FIG. 5 is a process flow routine of the steps carried out for activating one or more features of the currently running firmware in an RMU.

FEATURE ACTIVATION (FIG. 5)

As described above in connection with the description of the upgrade routine of FIG. 3, upgrading the existing firmware in the RMU involves the installation of a newer version of the firmware than the one currently running, which typically contains enhanced versions of currently available features or the addition of one or more features not previously provided in the earlier version of the software.

Feature activation is similar to an upgrade in that it involves an enhancement to the functionality of the currently active operating system. In particular, feature activation involves turning on or enabling one or more programmable features contained within the active version of the RMU operating system, but not currently allowed to be used by the RMU. Namely, until activated, operational features are invisible to the RMU processor. Associated with each operational features of a respective firmware version is a status or enabling bit, which may be set to one ('1') when the firmware is initially installed. Activation of a feature involves switching the state of the feature bit from its reset state (logical '1') to its opposite binary state (logical '0').

As described briefly above, and as detailed in the above-referenced co-pending application, each switchable feature status bit is preferably contained in a feature status table stored in a prescribed portion of memory. (To accommodate up to sixteen features, a pair of sequential feature bytes may be employed). A virtual to physical map associated with the feature byte may be employed to delineate which feature or features are to be selectively enabled in the active system. With flash memory, programming a memory bank involves first erasing the entire bank and then changing the erased states of selected memory cells. When a feature is to be switched on, it's associated status bit in the feature table is changed from its original reset state '1' to an active state '0'.

Like the upgrade routine of FIG. 3, since the feature activation routine involves an enhancement to equipment functionality, the functionality/use descriptor file is first examined in step 501, to whether a requested feature is available. If activation of the requested feature is not permitted or if the feature is not available (the answer to step 501 is NO), the routine is terminated. (The upgrade requester is also normally advised of the reason why the request feature activation was not performed.)

If it has been determined from the functionality/use descriptor file that the requested feature is available (the answer to step 501 is YES), then, at step 503, a communication is established between the accessing terminal unit and the RMU, using a prescribed connectivity sequence, as described above. Once connectivity with the destination RMU has been established, the host processor requests a copy of the bank descriptor table contained in the RMU (step 505), and analyzes the table in order to determine whether the currently running firmware version contains the requested feature(s). If the currently running version does not contain the feature to be activated, then an upgrade to a version of the operating system containing the requested feature is effected.

If, on the other hand, the currently active system contains the request feature(s), then, in step 507, the host processor commands the RMU to activate the feature by changing the logic state of the appropriate feature switch bit from its initially erased or zero state to a logical '1', as described above, thereby making the feature available for use in the currently active system. Once the requested feature activation is complete, the host processor terminates the connection (goes on-hook), in step 509.

Figure 6:
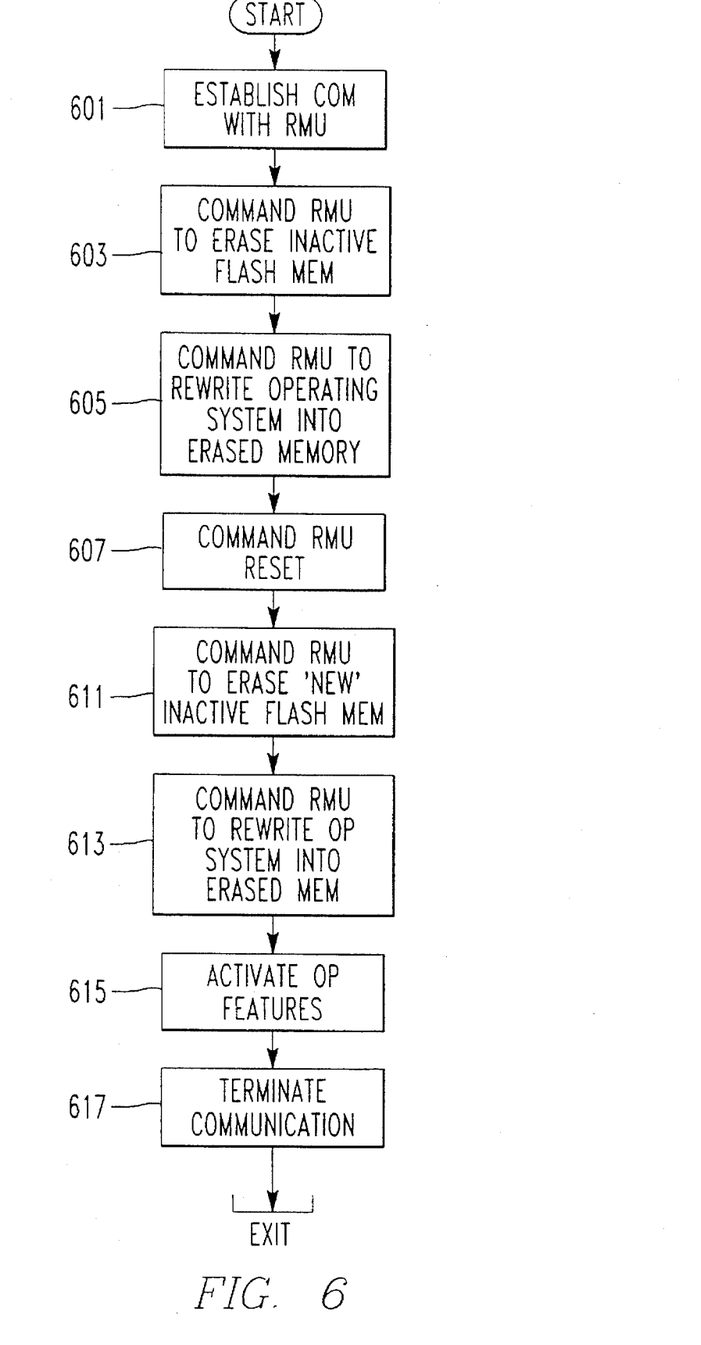
FIG. 6 is a process flow routine of the steps carried out for deactivating one or more features of the currently running firmware in an RMU.

FEATURE DEACTIVATION (FIG. 6)

The feature deactivation routine is employed when it is necessary to turn off or disable a feature that has been previously enabled, for example in the case of a feature that was inadvertently turned on when the operating system was originally installed. As pointed out above, because of the characteristics of flash memory devices, modification of their contents is a multi-step process involving an erasure of a complete block and then a rewriting of new data into the erased memory space. Therefore, in order to deactivate a feature, the host processor must erase the complete block of memory on the inactive system where the feature to be activated resides and then rewrite such erased blocks with the correct firmware code.

For this purpose, as shown at step 601, a communication is established between the accessing terminal unit and the RMU, as described above. Once connectivity with the destination RMU has been established, the host processor commands the RMU to erase each block of flash memory of the 'inactive' system which contains a feature to be deactivated (step 603). Next, in step 605, the host processor commands the RMU to rewrite the software (with no features turned on, i.e. reset to zero) into its associated blocks of flash memory of the RMU's inactive system.

Once a rewrite of the software to the designated blocks of inactive system has been completed, the host processor commands the RMU to reset itself (step 607), and reverses the states of the two memory banks, thereby making the inactive system where the reset features reside active, and the currently running system inactive.

With the system containing the disabled features now active, the host processor commands the RMU to erase each block of flash memory of the 'inactive' system, which contains a feature to be deactivated (step 611) and, at step 613, commands the RMU to rewrite the software (with no features turned on) into its associated blocks of flash memory of the RMU's inactive system.

In step 615, the host processor commands the RMU to activate selected features (excluding those to remain deactivated) by changing the logic state of the appropriate feature switch bit from its initially erased state (logical '1') to its opposite binary state (logical '0'), as described above, thereby making the non-deactivated features available for use in the currently active system. Once the requested feature activation is complete, the host processor terminates the connection (goes on-hook), in step 617.

As will be appreciated from the foregoing description, the cost in labor and down time involved in having a service technician travel to and physically access and remove a remote test unit for modification either on-site or returned to a maintenance facility for retrofit are substantially reduced in accordance with the present invention, by configuring the firmware-memory architecture of the unit's micro-controller with multiple (redundant), erasable flash memory systems, and selectively electronically erasing and replacing the contents of the active operating system, via a prescribed set of modification routines, as may be executed from a supervisory data terminal coupled to a central office, or via a personal computer connection to a serial port of the test unit.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communication system having a supervisory facility, and one or more remote sites at which respective programmable test devices are located, a respective programmable test device containing a resident test routine operating system for monitoring and testing network lines and subscriber termination equipment coupled thereto, said communication system further including at least one data terminal unit which has the capability of accessing said one or more remote test devices, a method of modifying the test routine operating system resident in the programmable test device of a remote site comprising the steps of:

(a) establishing a communication path between a data terminal unit and said programmable test device;

(b) examining, via said data terminal unit, information stored in said programmable test device, to determine the version level of the resident test routine operating system currently being employed by said programmable test device;

(c) via said data terminal unit, downloading to said programmable test device an upgraded test routine operating system to be employed by said programmable test device as a replacement for the test routine operating system currently being employed by said programmable test device; and (d) activating, via said data terminal unit, said upgraded test routine operating system, that has been downloaded to said programmable test device in step (b), in place of said resident test routine examined in step (a), so that said upgraded test routine operating system may be executed by said programmable test device.

2. A method according to claim 1, wherein step (a) includes the preliminary step of verifying the availability and transferability of said upgraded test routine operating system by way of said data terminal unit to said programmable test device.

3. A method according to claim 1, wherein step (b) comprises communicating, from said programmable test device to said data terminal unit, information representative of the version level of the currently active test routine operating system of said programmable test device.

4. A method according to claim 3, wherein said programmable test device contains first and second memory systems, said first memory system having stored therein said currently active resident test routine operating system, and said second memory system having an inactive test routine operating system stored therein, and wherein step (c) comprises downloading said upgraded test routine operating system to said second memory system, thereby replacing said inactive test routine operating system stored in said second memory system with said upgraded test routine operating system, and wherein step (d) comprises activating, via said data terminal unit, said upgraded test routine operating system stored in second memory system, in place of the test routine operating system stored in said first memory system, so as to cause said upgraded test routine operating system to be executed by said programmable test device.

5. A method according to claim 4, further including the step of (e) communicating, from said programmable test device to said data terminal unit, information representative of the version level of the replacement test routine operating system resident in said second memory system of said programmable test device.

6. A method according to claim 4, wherein step (e) comprises communicating, from said programmable test device to said data terminal unit, information representative of the contents of said first and second memory systems, so as to verify the version level of the replacement test routine operating system resident in said second memory system of said programmable test device.

7. A method according to claim 4, further including the step (e) of deactivating the replacement test routine operating system resident in said second memory system currently being executed by said programmable test device, and activating said inactive test routine operating system stored in said first memory system for execution by said programmable test device.

8. A method according to claim 4, wherein each of said first and second memory systems is comprised of electronically reprogrammable flash memory.

9. For use with a communication system having a supervisory facility, and one or more remote sites at which respective programmable remote test units are located, a respective programmable remote test unit containing a resident test routine operating system which, when executed, is controllably operative to monitor and test network lines and subscriber termination equipment coupled thereto, said communication system further including at least one data terminal unit which has the capability of accessing said one or more remote test units, a method of modifying a test routine resident operating system in said respective programmable remote test unit comprising the steps of:

(a) establishing a communication path between a data terminal unit and said programmable remote test unit;

(b) examining analyzing, via said data terminal unit, information stored in said programmable remote test unit to identify at least one disabled operational feature and determine which operational features of said active test routine operating system are currently enabled; and (c) via said data terminal unit, activating at least one disabled operational feature of said active test routine operating system of said programmable remote test unit, so that said at least one activated operational feature may be employed by the active test routine operating system of said programmable remote test unit.

10. A method according to claim 9, wherein step (a) includes the preliminary step of verifying the availability at and transferability from said data terminal device of said disabled operational feature to said programmable remote test unit.

11. A method according to claim 10, wherein step (b) comprises, in response to determining that the test routine operating system currently active in said programmable remote test unit lacks a prescribed operational feature, deactivating the test routine operating system currently active in said programmable remote test unit, and supplying to said programmable remote test unit from said data terminal device signals which cause an upgraded test routine operating system containing said prescribed operational feature to be stored in memory in said programmable remote test unit as a replacement for said test routine operating system currently active in said programmable remote test unit, and activating said upgraded test routine operating system, and wherein step (c) comprises enabling said prescribed operational feature contained within said upgraded test routine operating system in said programmable remote test unit, so that said prescribed operational feature may be employed by the replacement test routine operating system of said programmable remote test unit.

12. A method according to claim 11, wherein said programmable remote test unit contains first and second memory systems, said first memory system storing the currently active resident test routine operating system, and said second memory system storing an inactive test routine operating system, step (b) comprises downloading said upgraded test routine operating system to said second memory system, thereby replacing said inactive test routine operating system stored in said second memory system with said upgraded test routine operating system containing said prescribed operational feature to be employed by said programmable remote test unit as a replacement for the test routine operating system currently active in said programmable test device, and activating, via said data terminal unit, said upgraded test routine operating system that has been downloaded to said second memory system, whereby said upgraded test routine operating system containing said prescribed operational feature is executed by said programmable remote test unit.

13. A method according to claim 12, wherein step (b) further includes communicating, from said programmable remote test unit to said data terminal unit, information representative of the version level of the upgraded test routine operating system replaced in said programmable remote test unit.

14. A method according to claim 12, wherein each of said first and second memory systems is comprised of electronically reprogrammable flash memory.

15. For use with a communication system having a supervisory facility, and one or more remote sites at which respective programmable test devices are located, a respective programmable test device containing a resident operating system which is operative to monitor and test network lines and subscriber termination equipment coupled thereto, said communication system further including at least one data terminal unit which has the capability of accessing said respective programmable test devices, a respective programmable test device containing a first memory system which stores a currently active version of a monitor and test operating system, and a second memory system which stores an inactive version of a monitor and test operating system, a method of deactivating an operational feature contained within the currently active version of a monitor and test operating system stored in said first memory system of said programmable test device comprising the steps of:

(a) establishing a communication path between a data terminal unit and said programmable test device; and (b) via said data terminal unit, modifying the contents of the operating system stored in said first memory system of said programmable test device, so as to disable an operational feature and thereby prevent the operational feature that has been disabled from being employed in the course of execution of the currently active version of the monitor and test operating system of said programmable test device.

16. A method according to claim 15, wherein step (b) comprises erasing a portion of said second memory system containing said operational feature of said inactive version of said monitor and test operating system, writing, into said portion of said second memory system, a segment of the operating system previously contained in said portion of said second memory system, but with any operational features therein disabled, causing the inactive version of the monitor and test operating system to become the currently active version of the monitor and test operating system of said programmable test device, while deactivating the active version of the monitor and test operating system in said first memory system, and selectively enabling said operational feature of the currently active version of the monitor and test operating system.

17. A method according to claim 15, wherein step (b) comprises erasing a portion of said second memory system containing said operational feature of said inactive version of said monitor and test operating system, writing into said portion of said second memory system a segment of the operating system previously contained in said portion of said second memory system but with any operational features therein not yet enabled, causing the inactive version of said monitor and test operating system to become the currently active version of the monitor and test operating system routine of said programmable test device, while deactivating the active version of the monitor and test operating system in said first memory system, erasing a portion of said first memory system containing said operational feature of said inactive version of said monitor and test operating system, writing into said portion of said first memory system a segment of the operating system previously contained in said portion of said first memory system, but with any operational features therein not yet enabled, and selectively enabling said operational feature.

18. A method according to claim 15, wherein each of said first and second memory systems is comprised of electronically reprogrammable flash memory.

19. For use with a communication system having a supervisory facility, and one or more remote sites at which respective programmable test devices are located, a respective programmable test device containing a resident communication path monitor and test operating system for monitoring and testing network communication links and subscriber equipment coupled thereto, said communication system further including at least one data terminal unit which has the capability of accessing one or more respective programmable test devices, a respective programmable test device containing a first memory system which stores a currently active version of said operating system, and a second memory system which stores an inactive version of said operating system, a method of downgrading the currently active version of said operating system comprising the steps of:

(a) establishing a communication path between a data terminal unit and said programmable test device;

(b) via said data terminal unit, causing a prescribed invalid code to be written into a prescribed portion of the operating system stored in said first memory system within said programmable test device, which prescribed invalid code is effective to declare the version of the operating system stored in said first memory system invalid and prevent its use in the course of an initial default condition of said programmable test device; and (c) via said data terminal unit, causing said programmable test device to be reset to said initial default condition, in response to which the previously inactive operating system stored in said second memory system becomes a newly currently active operating system executed by said programmable test device.

20. A method according to claim 19, further including the step of (d) communicating, from said programmable test device to said data terminal unit, information representative of the version level of said newly active operating system in said programmable test device.

21. A method according to claim 19, wherein each of said first and second memory systems is comprised of electronically reprogrammable flash memory.

22. For use with a communication system having a supervisory facility, and one or more remote sites at which respective programmable test devices are located, a respective programmable test device containing a resident test routine operating system for monitoring and testing network lines and subscriber termination equipment coupled thereto, said communication system further including at least one data terminal unit which has the capability of accessing said one or more remote test devices, a method of modifying the test routine operating system resident in the programmable test device of a remote site comprising the steps of:

(a) establishing a communication path between a data terminal unit and said programmable test device;

(b) via said data terminal unit, examining information stored in said programmable test device to determine the version of one or more test routine operating systems currently stored in said programmable test device;

(c) via said data terminal unit, replacing the currently active version of a test routine operating system in said programmable test device by a different version of said test routine operating system; and (d) activating, via said data terminal unit, said different version of said test routine operating system, so that different version of said test routine operating system may be executed by said programmable test device.

23. A method according to claim 22, wherein step (a) includes the preliminary step of verifying the availability and transferability of said different version of said test routine operating system by way of said data terminal unit to said programmable test device.

24. A method according to claim 22, wherein said programmable test device contains first and second memory systems, said first memory system having stored therein said currently active version of said test routine operating system, and said second memory system having said different version of said test routine operating system stored therein, and wherein step (d) comprises activating said different version of the test routine operating system resident in said second memory system in said programmable test device, and causing said different version of said test routine operating system to be executed by said programmable test device.

25. A method according to claim 24, wherein said step (c) comprises erasing said second memory system and downloading, from said supervisory facility to the erased second memory system, said different version of said test routine operating system.

26. A method according to claim 25, wherein said step (d) comprises causing said programmable test device to be reset and, upon being reset, to default to said second memory system containing said different version of said test routine operating system, so that different version of said test routine operating system may be executed by said programmable test device.

27. A method according to claim 26, wherein each of said first and second memory systems is comprised of electronically reprogrammable flash memory.

28. A method according to claim 26, wherein step (d) comprises marking the version of the operating system stored in said first memory system with an invalid code, so as to declare the version of the operating system stored in said first memory system invalid and prevent its use in the course of causing said programmable test device to be reset, whereby said programmable test device, upon being reset, will default to said second memory system containing said different version of said test routine operating system, so that different version of said test routine operating system may be executed by said programmable test device.

29. A method according to claim 22, wherein step (c) comprises replacing the currently active version of a test routine operating system in said programmable test device by an upgraded version of said test routine operating system.

* * * * *